UNITED STATES PATENT OFFICE.

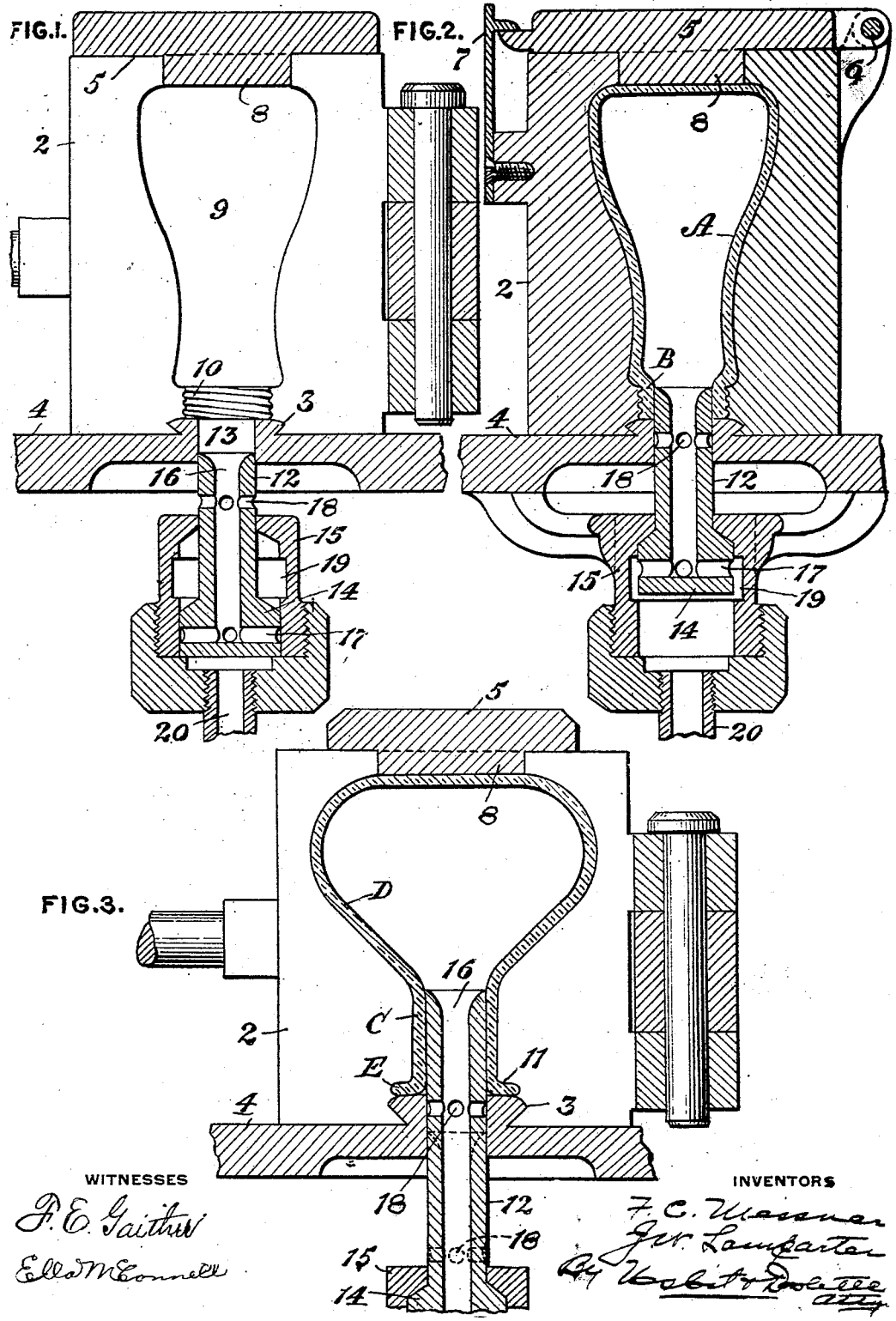

FRED C. MESSNER AND JOHN WILLIAM LAMPARTER, OF MOUNDSVILLE, WEST VIRGINIA.

GLASS-MOLDING APPARATUS.

1,143,423.   Specification of Letters Patent.   Patented June 15, 1915.

Application filed May 12, 1914. Serial No. 838,045.

*To all whom it may concern:*

Be it known that we, FRED C. MESSNER and JOHN W. LAMPARTER, citizens of the United States, and residents of Moundsville, in the county of Marshall and State of West Virginia, have invented certain new and useful Improvements in Glass-Molding Apparatus, of which the following is a specification.

This invention relates to the manufacture of hollow glassware, and particularly to blown-body articles having end or neck portions which are shaped by pressing, and the primary object is to provide improved means for automatically controlling and timing the flow of air which blows the article body, the admission of this air being governed by the movement of the plunger in such manner that it enters the glass after the plunger has accomplished the neck forming or pressing operation.

A further object is to so arrange the mechanism that the air which operates the pressing plunger is utilized for the subsequent blowing operation, its passage around the plunger operating piston and through the plunger being controlled by the movement of the piston.

In the accompanying drawings, Figure 1 is a vertical section of an adaptation of the apparatus for producing threaded-end condiment holders, one section of the two-part mold being in elevation with the plunger mechanism in retracted position. Fig. 2 is a similar view with the plunger mechanism raised, in this view the mold cavity being shown at right angles to Fig. 1, thereby illustrating the two mold sections. Fig. 3 is a view similar to Fig. 1 showing an adaptation of the mechanism for molding a lip-formed article such as a small decanter, the plunger being shown in raised position.

Referring to the drawings, the mold 2 is of usual sectional form with the sections thereof raised to close around a boss 3 on base plate 4 as is usual in glass mold practice, the mold sections being hinged-connected and provided with handles in the usual manner.

The mold is open at its top for the insertion of a proper quota of glass, the opening being closed by a suitable cover 5 which may be hinged at 6 to one end of the mold sections, and with a spring latch 7 carried by the other section for retaining it in closed position, the cover formed with the projecting head or boss 8 which forms an end wall of proper shape for the molding cavity 9. The lower end of the molding cavity is shaped to impart the desired finish or configuration to the end of the article, in the adaptation of Figs. 1 and 2 this extremity portion being reduced and properly grooved to form the threaded cavity 10 in which is shaped the threaded neck B of a salt cellar or other condiment holder A. In the form shown in Fig. 3, the lower portion of the molding cavity is reduced to form the neck C of a decanter-like vessel D, and at the base of the neck-forming cavity is the annular offset 11 for the neck lip E.

The plunger 12 which coöperates with the mold is adapted to enter the latter through an opening 13 in base plate 4, the plunger projecting from a piston 14 operative in cylinder 15. The plunger is ported longitudinally at 16 and this port extends into and opens laterally through piston 14 as indicated at 17. Also opening outwardly from port 16 are the exhaust ports or outlets 18. The bore of cylinder 15 is formed with the annular port 19, and when the plunger is projected into mold coöperating position, as in Fig. 2, the rear end of the piston overlaps port 19, thereby opening communication between ports 16 and 17 and the rear end of the cylinder and admitting air from the latter to the mold. Compressed air from any suitable source may pass to the cylinder through inlet 20.

In operation, with the plunger retracted, as in Fig. 1, a suitable quota of glass is placed in the mold, and the latter is closed by cover 5. With the plunger in lowered position exhaust ports 18 are open to the atmosphere so that the air within the lower portion of the mold and beneath the glass may freely escape. Thereupon air is admitted to cylinder 15 which results in raising the piston and projecting the plunger into the mold, thereby accomplishing the major portion of the neck-forming operation within the contracted extremity of the mold cavity, in the adaptation of Fig. 2 the threaded extremity of the condiment holder being thus formed, and in the adaptation shown in Fig. 3 the neck and lip of the article being given proper shape. Elevation of the plunger closes exhaust ports 18 by placing them within base openings 13, and as the upward movement approaches completion piston 14 uncovers the lower end of cylinder port 19, thereby passing piston-actuating air around the end of the piston and through ports 17 and plunger port 16 into the mold and blowing the body of the article and at the same time completing so much of the neck-shaping portion as has not been carried to completion by the entrance of the plunger into the mold.

From the foregoing, it will be seen that the blowing air is automatically controlled and that the same air or air source is used for actuating the plunger-raising piston and for expanding the body of the article into completed form. The mechanism is adapted to be variously used for the production of pressed-neck blown-body articles, those here illustrated being only examples of many articles for the manufacture of which the invention may be employed.

We claim:—

1. The combination of a mold having a portion thereof adapted to coöperate with a plunger in shaping a part of the glass article by pressing, the mold also having a portion in which another part of the article is shaped by blowing, a plunger adapted to enter the mold and coöperate with the portion thereof in which the pressed part of the article is shaped, the plunger formed with an air passage which at one end is open through the mold-entering portion of the plunger and with another part of the passage open to admit compressed air when the plunger is in position for such admission, and a part having an air supply passage with which the plunger passage is adapted to register during the mold-entering movement of the plunger.

2. The combination of a glass mold having a portion thereof shaped to form the exterior of an article neck and another portion shaped to form part of the article by blowing, a tubular plunger adapted to be entered in the mold and coöperate with the neck-shaping portion of the latter, a plunger-actuating piston and cylinder, the piston and cylinder being ported with the piston port communicating with the plunger bore, the piston and cylinder ports adapted to be placed in register by the mold-entering movement of the plunger for admitting compressed air through the latter and into the mold while the plunger is in pressing position.

3. The combination of a glass mold, a tubular plunger adapted to enter the mold and coöperate with the latter in forming a portion of an article, the mold having a part in which another portion of the article is formed by blowing, the plunger formed with exhaust ports adapted to be closed and opened, respectively, by the mold-entering and withdrawing movements of the plunger, and means operative while the plunger is entered in the mold for admitting compressed air to the latter through the plunger.

4. The combination of a mold having a portion thereof shaped to coöperate with a plunger in shaping a portion of a glass article by pressing, the mold also having a part in which another portion of the article is shaped by blowing, a plunger adapted to be entered in the mold, the plunger ported longitudinally through its pressing extremity with said port open laterally, and a part through which the plunger moves having an air admission port positioned to register with the lateral port of the plunger for admitting compressed air through the plunger to the mold when the plunger is in pressing position.

5. The combination of a mold having a portion thereof shaped to coöperate with a plunger in shaping a portion of a glass article by pressing, the mold also having a part in which another portion of the article is shaped by blowing, a plunger adapted to be entered in the mold, the plunger ported longitudinally through its pressing extremity with the longitudinal port having a lateral branch for admitting air and also having a lateral outlet located intermediate said air-admitting branch and the pressing extremity of the plunger, means for closing the lateral outlet when the plunger is entered in the mold and for opening the same when the plunger is withdrawn, and a part through which the plunger moves having a port positioned to register with the lateral inlet branch of the plunger port when the plunger is in pressing position for admitting compressed air through the plunger and into the mold.

6. The combination of a glass mold shaped at one end to form the exterior of an article, a plunger adapted to be entered in the mold and coöperate with the mold-end formation for shaping the article neck, a piston secured to the plunger, and a cylinder in which the piston operates, the plunger formed with a longitudinal port which is open laterally through a face of the piston, the cylinder being ported to admit piston-actuating fluid into the plunger and piston port after the piston has been moved sufficiently to project the plunger into the mold.

7. The combination of a glass mold, a tubular plunger adapted to enter the mold and coöperate with the latter in forming one end of an article, a plunger-actuating piston and cylinder, and means for admitting piston-actuating fluid into the tubular plunger after the latter has been projected into the mold.

8. The combination of a glass mold, a tubular plunger adapted to be entered therein and coöperate with the mold in shaping an end of a glass article, a piston to which the plunger is secured, a cylinder for the piston, and means operative after the plunger has been projected into the mold for passing fluid from the cylinder into the plunger.

9. The combination of a glass mold, a tubular plunger adapted to be entered in and coöperate with the mold in forming one end of an article, a piston secured to the plunger and with a port extending through the plunger and laterally through the piston, a cylinder for the piston, the cylinder bore being ported to establish communication between the rear end of the cylinder and the piston port after the piston has moved sufficiently to project the plunger into the mold.

In testimony whereof, we affix our signatures in presence of two witnesses.

FRED C. MESSNER.
JOHN WILLIAM LAMPARTER.

Witnesses:
  A. W. KOENEMUND,
  R. D. FANKHOUSER.